UNITED STATES PATENT OFFICE.

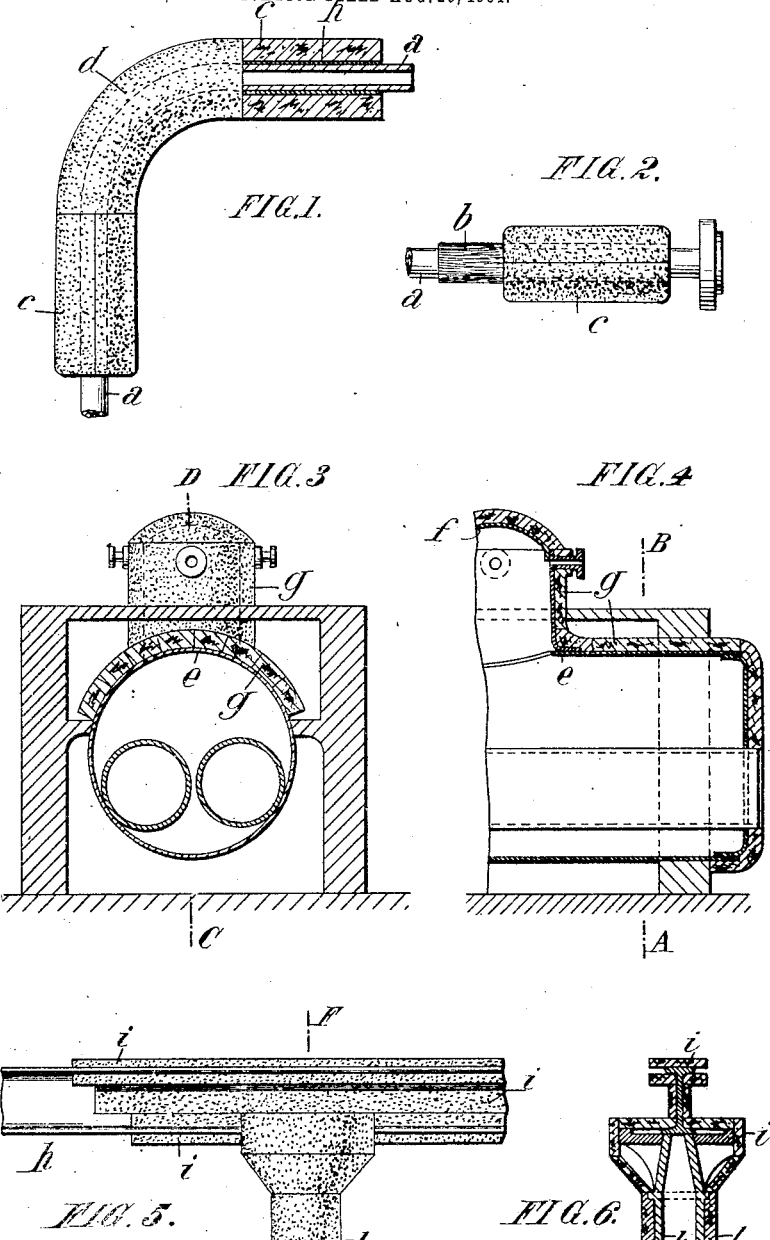

GUSTAV HEINRICH MÜLLER, OF KIEL, AND EDUARD JARCK, OF HAMBURG, GERMANY.

HEAT-NON-CONDUCTING MATERIAL.

No. 810,342. Specification of Letters Patent. Patented Jan. 16, 1906.

Application filed August 20, 1904. Serial No. 221,560.

*To all whom it may concern:*

Be it known that we, GUSTAV HEINRICH MÜLLER, a resident of Kiel, and EDUARD JARCK, a resident of Hamburg, Germany, subjects of the German Emperor, have invented a new and useful Heat-Non-Conducting Material, adapted to be used for covering boilers, steam-pipes, and for other like purposes and by the use or application of which the loss of heat is reduced to a minimum, of which the following is a specification.

The material is of a pasty constitution, having such a density as to resist to a very considerable extent expansion or distension due to the action of heat or a drying action or dampness.

An important technical advantage possessed by our material as compared with other heat-non-conducting means hitherto used consists in its easy application, whether on the perfectly flat front surface of boilers or on pipes or more complicated surfaces or on tanks, &c., and the adhesive power of said material enables it to be applied without its having to be bound around with wire or fixed by any equivalent means hitherto found necessary.

Our improved heat-non-conducting material is composed of refractory clay, fibers of amianthus, infusory earth, ground cork, vegetable fibers, yeast, and sulfate of alumina, or other analogous materials. These materials are intimately mixed in suitable proportions by mixing machinery and constitute a moist tenacious mass which is ready to be used. This mass, slightly pressed in suitable molds and afterward dried, may be used in the form of shells around boilers or pipes. To fix these shells to a pipe or the like, the latter is first covered with a little of the pasty mass, and the shells are then firmly applied. The joints between the edges of the shells are afterward filled in with some of the pasty mass, the whole forming a solid envelop capable of resisting high temperature, even up to 500° centigrade. Further, the mass may be fashioned or molded by a press into plates or slabs or into blocks, which may be used equally well in refrigerating installations or for the protection of beams, iron-work, stonework of stoves and furnaces, the material being refractory and incombustible.

The function of the yeast is to somewhat distend or lighten up the moist mass, whereby the latter acquires greater insulating power and becomes lighter and more elastic.

In the annexed drawings various applications of our improved material are illustrated.

Figures 1 and 2 show an elbow or bend and a pipe covered with our material in the form of shells and paste. On the bend *a* a thin coating *b* of the material is first applied, on which shells *c* are pressed. The part *d*, on account of its being curved, is preferably entirely covered with pasty material. The pipe shown in Fig. 2 is covered in a similar manner.

Figs. 3 and 4 show a boiler-shell and its dome covered with our material, the former figure being a sectional view on line A B of Fig. 4 and the latter a sectional view on line C D of Fig. 3. While the cylindrical surfaces of the boiler *e* and of the dome *f* are advantageously covered by shells *g*, the flat front surfaces are covered with the material in a pasty condition.

Figs. 5 and 6 show a girder or beam and a column covered by plates and shells formed of our improved material, the former figure being a side elevation and the latter a sectional end elevation on line E F of Fig. 5.

The girder or beam *h* is covered with non-conducting plates *i* and the column *k* with non-conducting shells *l*.

What we claim as our invention, and desire to secure by Letters Patent, is—

A heat-non-conducting material consisting of refractory clay, fibers of amianthus, infusory earth, ground cork, vegetable fibers, yeast and sulfate of alumina, these substances being mixed so as to form a pasty mass, or pressed into shells, plates or blocks suitable to be used for covering steam-boilers, pipes, tanks or the like, for the purpose and substantially as set forth.

In testimony whereof we affix our signatures in presence of two witnesses.

GUSTAV HEINRICH MÜLLER.
EDUARD JARCK.

Witnesses:
W. G. MISCHKI,
JULIUS ROPKE.